US011666995B2

(12) United States Patent
Twerdocleb et al.

(10) Patent No.: US 11,666,995 B2
(45) Date of Patent: Jun. 6, 2023

(54) PIPE SPINNER AND LIFTER

(71) Applicant: Precision Fiberglass Piping Inc., Red Deer (CA)

(72) Inventors: Colin Twerdocleb, Sylvan Lake (CA); Nathan Ristau, Bentley (CA)

(73) Assignee: PRECISION FIBERGLASS PIPING INC., Red Deer (CA)

( * ) Notice: Subject to any disclaimer, the term of this patent is extended or adjusted under 35 U.S.C. 154(b) by 697 days.

(21) Appl. No.: 16/733,230

(22) Filed: Jan. 2, 2020

(65) Prior Publication Data
US 2020/0139497 A1 May 7, 2020

Related U.S. Application Data

(63) Continuation-in-part of application No. 16/503,350, filed on Jul. 3, 2019.

(60) Provisional application No. 62/693,447, filed on Jul. 3, 2018.

(51) Int. Cl.
*B23P 19/06* (2006.01)
(52) U.S. Cl.
CPC .................. *B23P 19/061* (2013.01)
(58) Field of Classification Search
CPC .. B66C 1/422; B66C 1/42; B66C 1/48; B66C 1/585; B66C 1/625; B66C 1/22; B66C 1/28; B65G 7/12; B23P 19/061; F16L 1/036
See application file for complete search history.

(56) References Cited

U.S. PATENT DOCUMENTS

| 1,301,728 | A | * | 4/1919 | Milne | B66C 1/422 |
| | | | | | 294/106 |
| 1,877,974 | A | * | 9/1932 | Robb | F16L 1/038 |
| | | | | | 414/745.6 |
| 3,155,416 | A | * | 11/1964 | Buchik | B66C 1/422 |
| | | | | | 294/110.1 |
| 3,710,475 | A | * | 1/1973 | Bronstein | F16L 1/10 |
| | | | | | 29/431 |
| 3,757,837 | A | * | 9/1973 | French | A01G 23/095 |
| | | | | | 144/24.13 |
| 3,777,103 | A | * | 12/1973 | White | B23K 9/0286 |
| | | | | | 219/60 A |
| 4,446,761 | A | * | 5/1984 | Boyadjieff | E21B 19/168 |
| | | | | | 81/57.2 |
| 4,512,216 | A | * | 4/1985 | Callegari, Sr | E21B 19/168 |
| | | | | | 81/57.17 |

(Continued)

*Primary Examiner* — Christopher M Koehler
(74) *Attorney, Agent, or Firm* — Sander R. Gelsing

(57) ABSTRACT

In one aspect there is provided a pipe spinner and lifter for supporting and rotating a cylindrical member having a longitudinal axis. The pipe spinner and lifter comprises a pair of jaws that pivot about a pivot member, to allow the pipe spinner and lifter to actuate between an open configuration and a closed configuration. A plurality of rollers are mounted on the jaws, each rotatable about a rolling axis. When the pipe spinner and lifter is in the closed configuration, the cylindrical member can be rotatably captured by the pipe spinner and lifter, allowing the cylindrical member to rotate about its longitudinal axis. Preferably, the plurality of rollers are arranged in a substantially mirrored arrangement on the jaws. More preferably, the rolling axis of each of the rollers is substantially parallel to the cylindrical member's longitudinal axis.

15 Claims, 13 Drawing Sheets

(56) References Cited

U.S. PATENT DOCUMENTS

| | | | | |
|---|---|---|---|---|
| 4,742,854 | A * | 5/1988 | Forslund | A01G 23/097 198/813 |
| 5,354,150 | A * | 10/1994 | Canales | B23P 19/061 405/184.5 |
| 5,957,177 | A * | 9/1999 | Smith | A01G 23/083 144/248.7 |
| 6,280,119 | B1 * | 8/2001 | Ryan | B66C 1/427 405/175 |
| 2005/0034565 | A1 * | 2/2005 | Drzewiecki | E21B 19/164 81/57.17 |
| 2009/0314137 | A1 * | 12/2009 | Perez | E21B 19/168 81/57.16 |
| 2014/0259597 | A1 * | 9/2014 | Lavalley | B23K 31/02 72/46 |
| 2015/0275599 | A1 * | 10/2015 | Russo | E21B 19/163 166/380 |
| 2016/0169413 | A1 * | 6/2016 | Camacho | F16L 1/06 414/745.6 |
| 2017/0037689 | A1 * | 2/2017 | Perez | E21B 19/161 |
| 2017/0314350 | A1 * | 11/2017 | McClure | E21B 19/168 |
| 2018/0236479 | A1 * | 8/2018 | Bamford | B05C 1/0821 |
| 2018/0347294 | A1 * | 12/2018 | Vo | E21B 19/161 |
| 2018/0347296 | A1 * | 12/2018 | Vo | E21B 19/168 |
| 2019/0039199 | A1 * | 2/2019 | Webb | B05D 7/146 |
| 2019/0261582 | A1 * | 8/2019 | Matsumoto | A01G 23/083 |

* cited by examiner

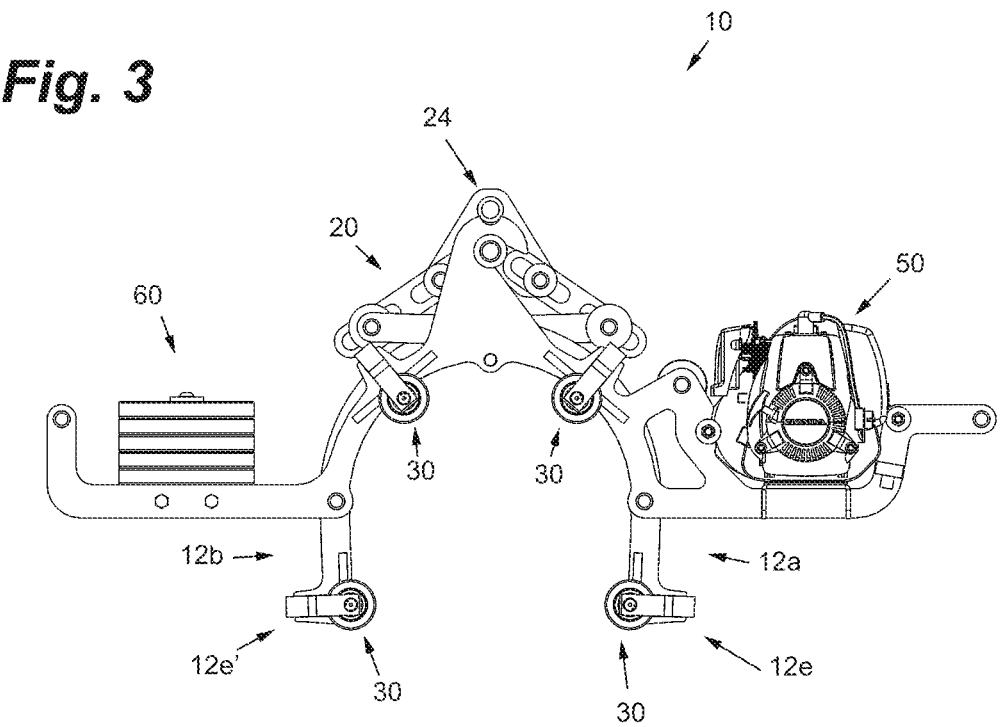
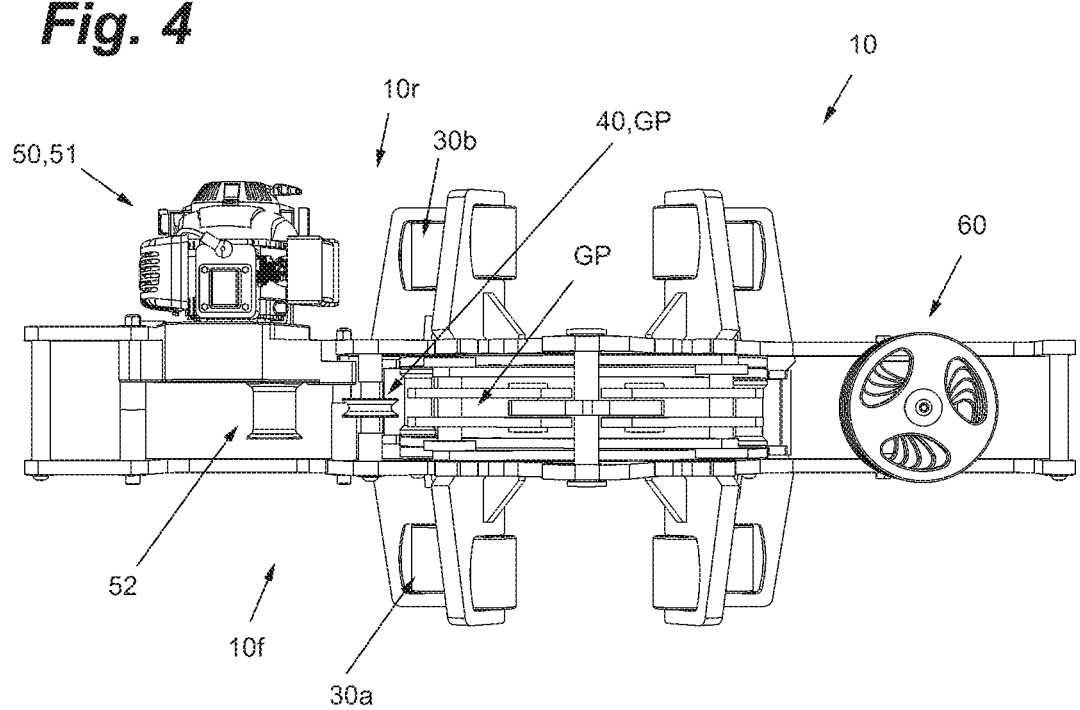

PIPE SPINNER AND LIFTER

CROSS REFERENCE TO RELATED APPLICATION

This application is a continuation-in-part of U.S. application Ser. No. 16/503,350, filed Jul. 3, 2019, entitled "Pipe Spinner and Lifter", which claims priority to, and benefit of, U.S. Provisional Patent Application Ser. No. 62/693,447 filed Jul. 3, 2018 and also entitled, "Pipe Spinner and Lifter", both of which are incorporated by reference herein in their entirety for all purpose.

FIELD OF THE INVENTION

The field of the present invention relates generally to providing a pipe spinner and, more particularly, to providing a pipe spinner and lifter for supporting and rotating pipe and other cylindrical members in a substantially horizontally oriented manner to facilitate both lifting and threading sections of pipe together.

BACKGROUND OF THE INVENTION

In the piping and pipeline industry there is often a need to move or manipulate sections of pipe, as well as to thread together (or unthread) sections of pipe; e.g. such as during installation of pipelines and piping systems.

Sections of pipe may be moved manually, by being gripped and lifted by one or more workers. Slings, chains and hydraulic lifting booms may also be used to lift pipe. A scissor action pipe lifter or pipe clamp is often employed to securely lift and move sections of pipe, wherein the section of pipe is securely gripped in a substantially horizontal manner (i.e. with the pipe's longitudinal axis being oriented substantially horizontal) until the pipe is laid down or released. Scissor action pipe clamps normally comprise pads or the like on their jaws which, when the clamp is actuated during a lift, apply a high static friction force against the pipe to keep it from slipping while being lifted. However, this also prevents the section of pipe from rotating about its longitudinal axis while it is engaged by a scissor-type pipe clamp.

In spinning or rotating a pipe about its longitudinal axis, to thread or unthread a pipe section, the practice heretofore has been to first position the pipe in place (e.g. on the ground, or on pipe stands with roller heads) and then to use a strap wrench or chain wrench to manually turn the pipe. Therefore, any pipe rotation (threading/unthreading) would be done after a section of pipe was positioned or lifted to the desired location, and after any scissor-type pipe clamp has disengaged from the section of pipe. However, this two-step process is very labour intensive, may create dangerous or worker safety issues, and often adds significantly to the costs associated with pipeline or piping installations.

An advantage therefore exists to reduce or eliminate the need for such manual labour and/or for a pipe clamp or lifter to also facilitate pipe rotation (about a pipe's longitudinal axis) while still being gripped or engaged by such a pipe clamp.

BRIEF DESCRIPTION OF THE DRAWINGS

Referring to the drawings, several aspects of the present invention are illustrated by way of example, and not by way of limitation, in detail in the figures, wherein:

FIG. 3 is a rear view of the pipe spinner and lifter of the embodiment of FIG. 1;

FIG. 4 is a top view of the pipe spinner and lifter of the embodiment of FIG. 1;

DETAILED DESCRIPTION OF THE PREFERRED EMBODIMENTS

Figure 1:
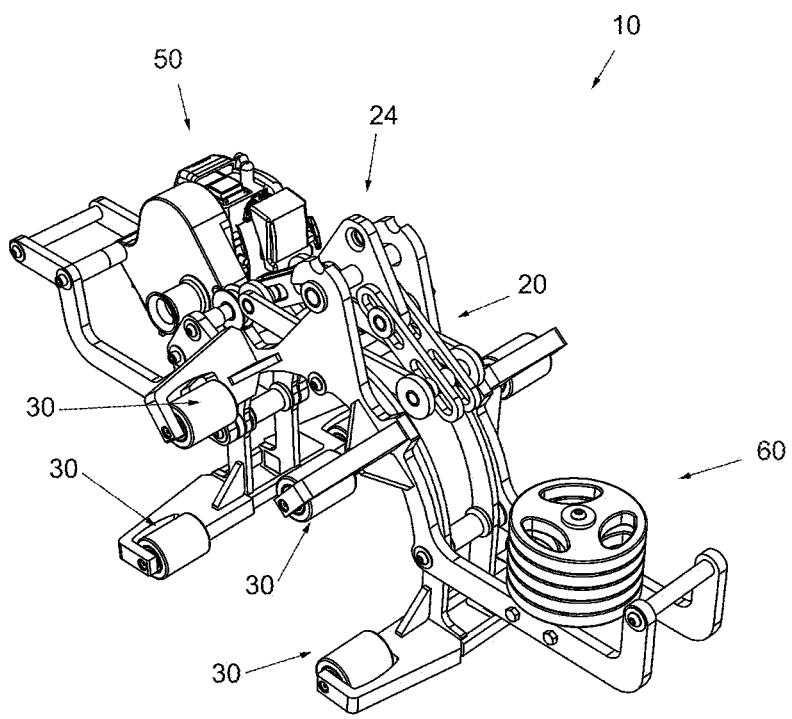
FIG. 1 is a front perspective view of one embodiment of the pipe spinner and lifter according to the present invention.
Figure 2:
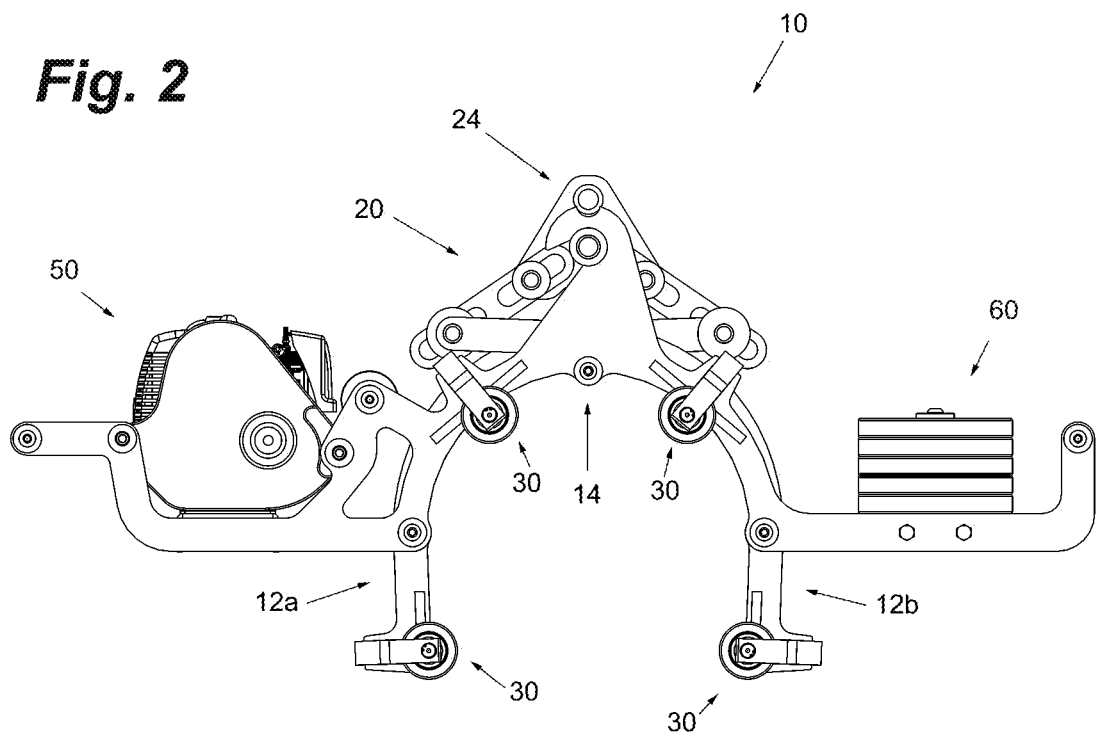
FIG. 2 is a front view of the pipe spinner and lifter of the embodiment of FIG. 1.
Figure 5:
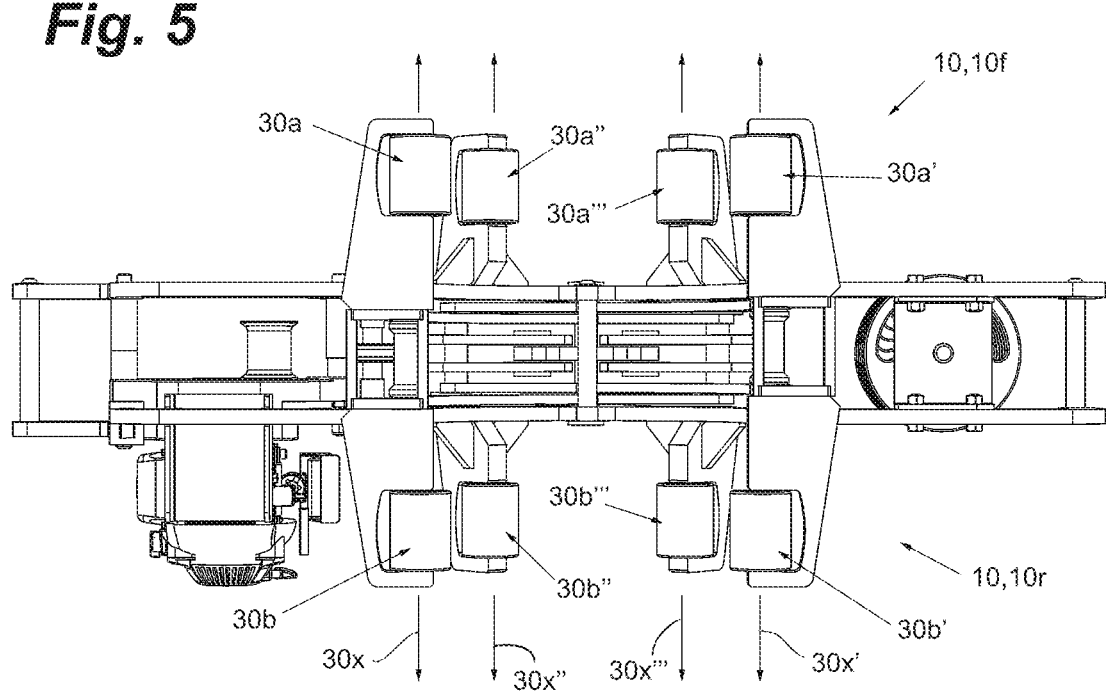
FIG. 5 is a bottom view of the pipe spinner and lifter of the embodiment of FIG. 1.
Figure 6:
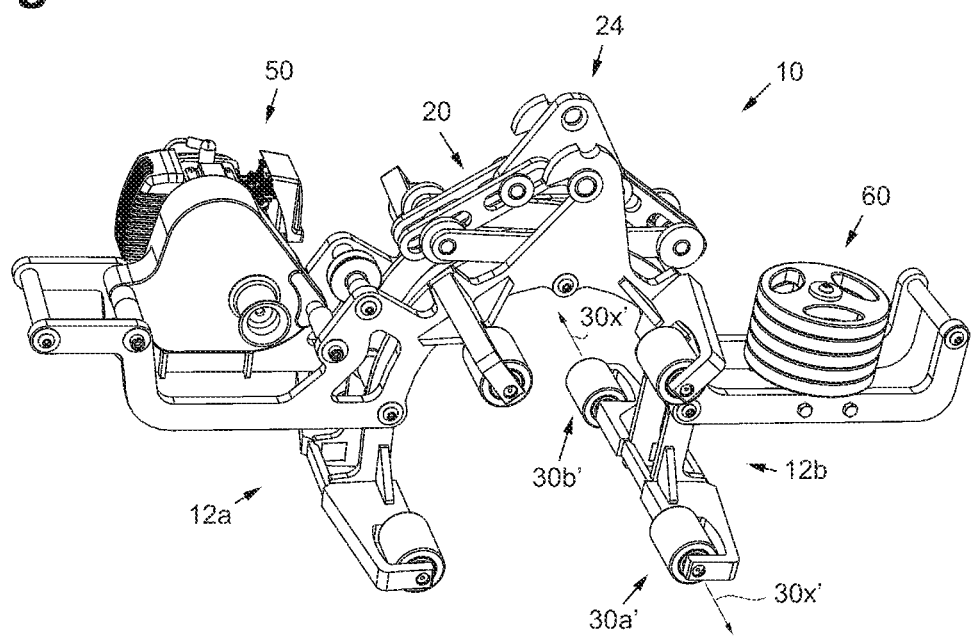
FIG. 6 is another front perspective view of the pipe spinner and lifter of the embodiment of FIG. 1.
Figure 7:
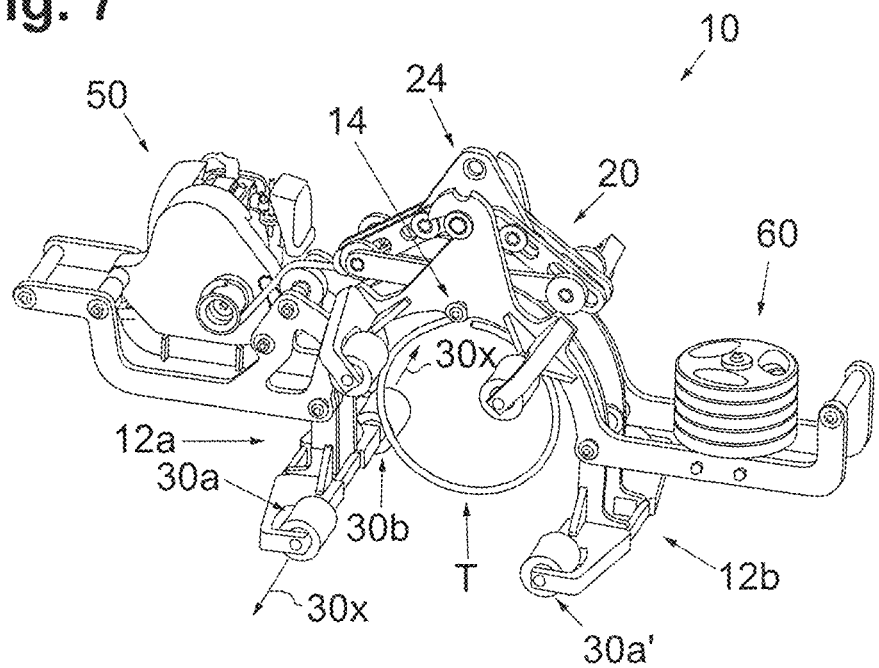
FIG. 7 is another front perspective view of the pipe spinner and lifter of the embodiment of FIG. 1, showing a tensile member wound therethrough.

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Figure 8:
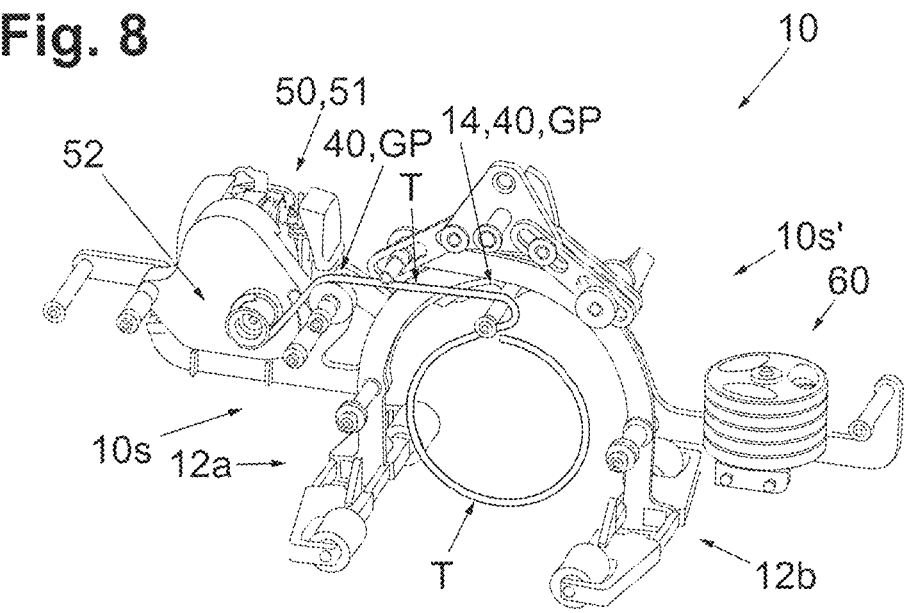
FIG. 8 is a front perspective view of the pipe spinner and lifter of the embodiment of FIG. 1, with some components hidden, so as to more clearly show the tensile member wound therethrough.
Figure 9:
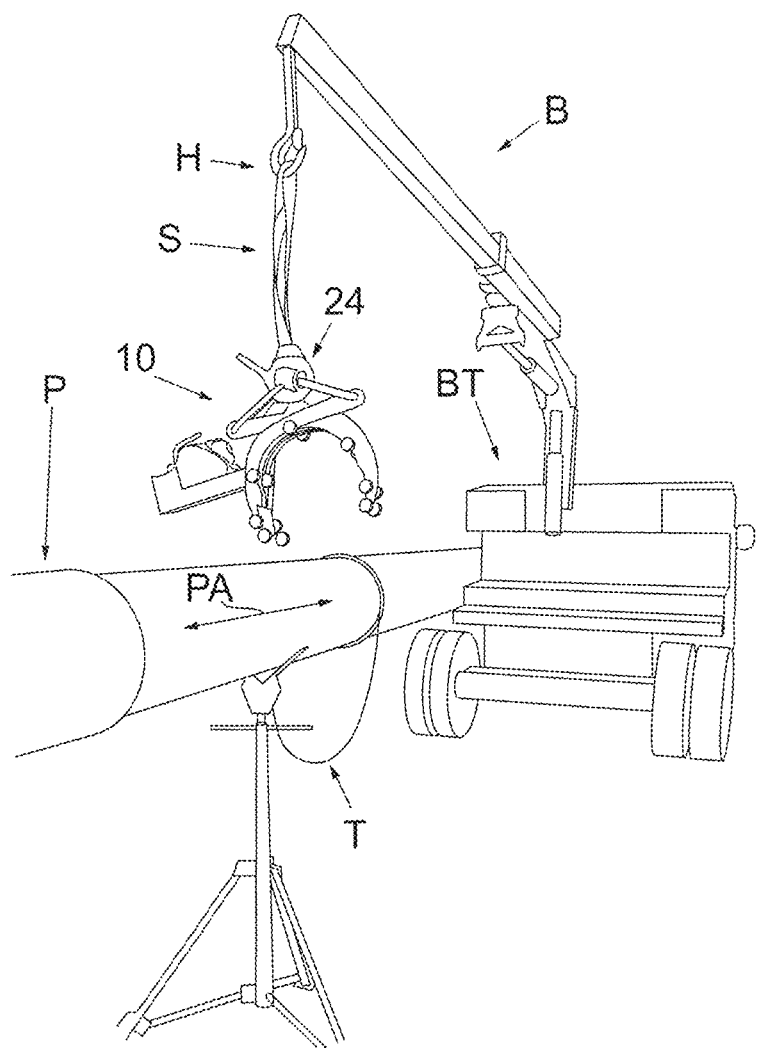
FIG. 9 is a perspective view of another embodiment of a pipe spinner and lifter according to the present invention, shown in the open configuration about to be positioned over a pipe.
Figure 10:
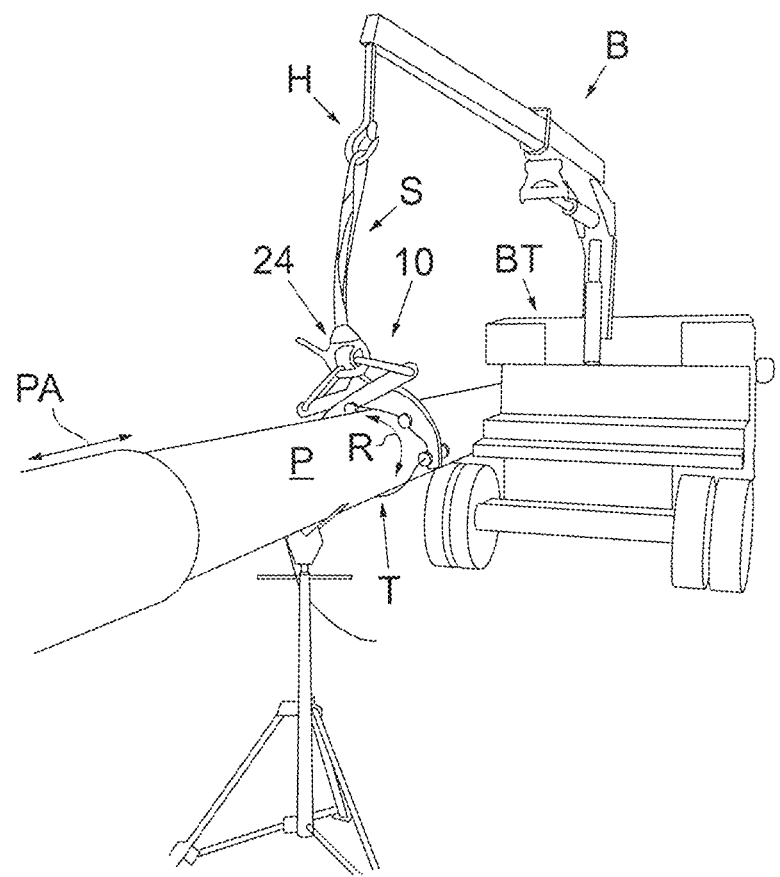
FIG. 10 is a perspective view of the pipe spinner and lifter of the embodiment of FIG. 9, shown positioned on a pipe.
Figure 11:
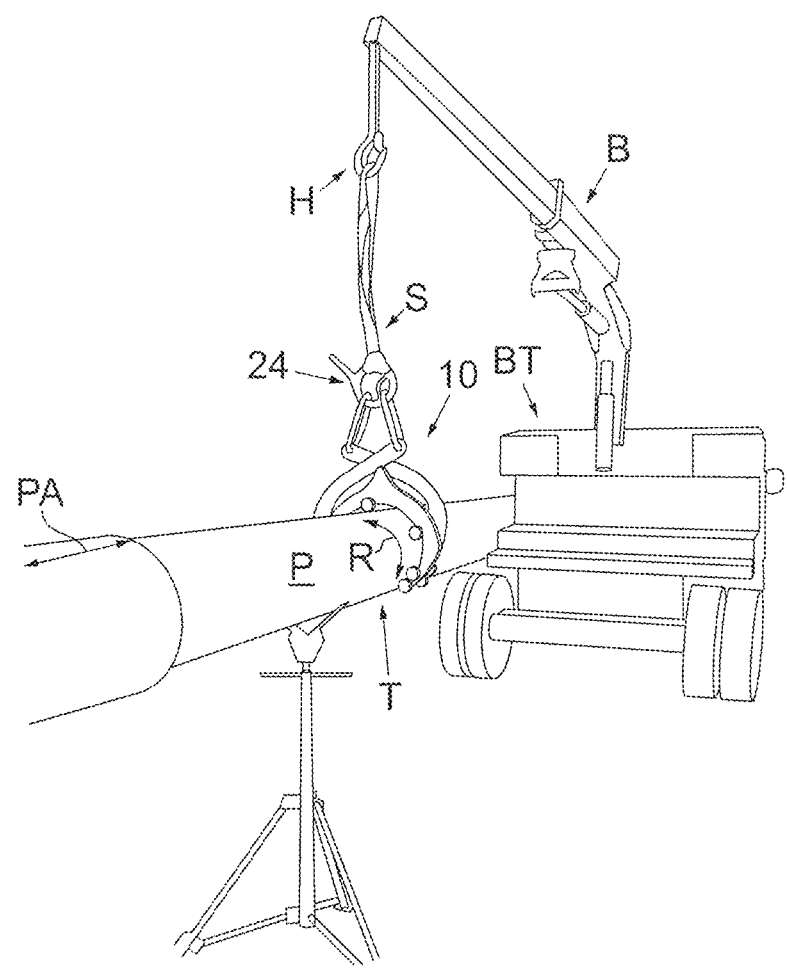
FIG. 11 is a perspective view of the pipe spinner and lifter of the embodiment of FIG. 9, shown positioned on a pipe in the closed configuration.
Figure 12:
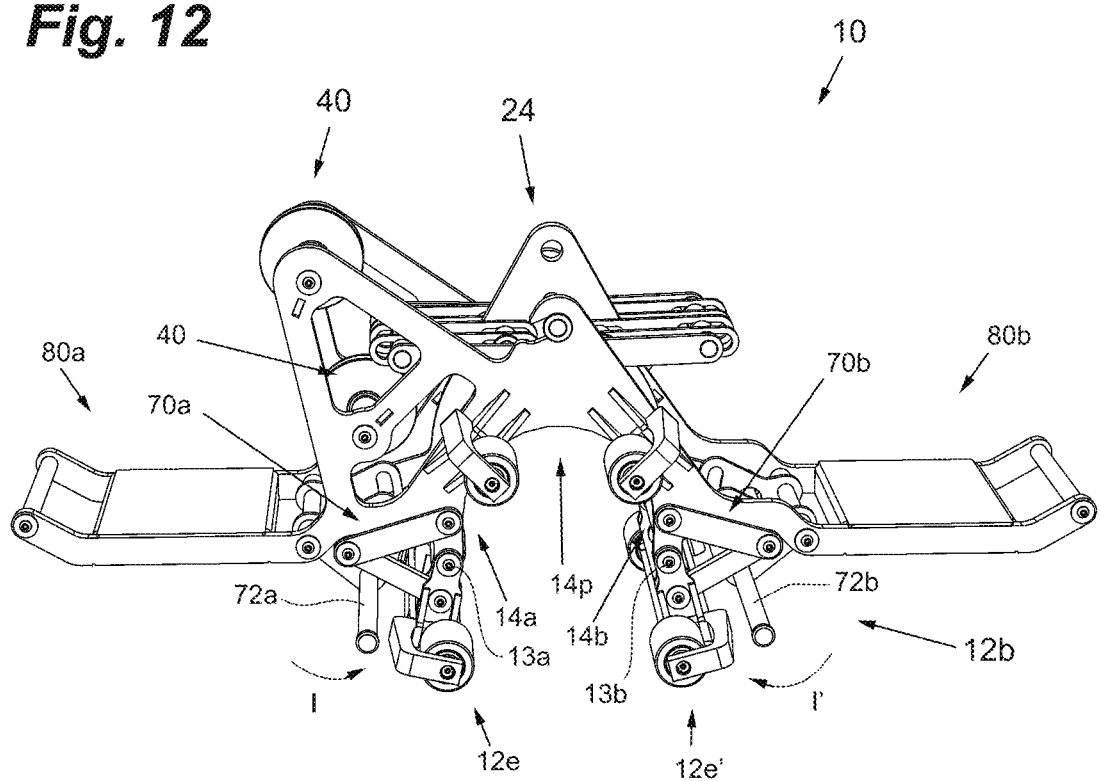
FIG. 12 is a front perspective view of yet another embodiment of a pipe spinner and lifter according to the present invention, shown in the open and unlocked configurations.
Figure 13:
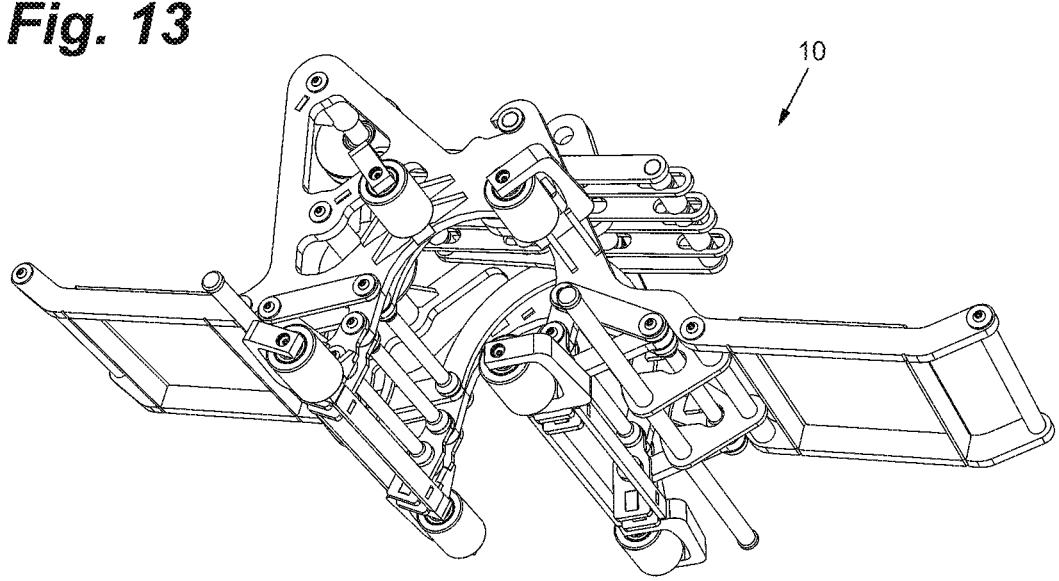
FIG. 13 is a front bottom perspective view of the pipe spinner and lifter of the embodiment of FIG. 12, shown in the open and unlocked configurations.
Figure 14:
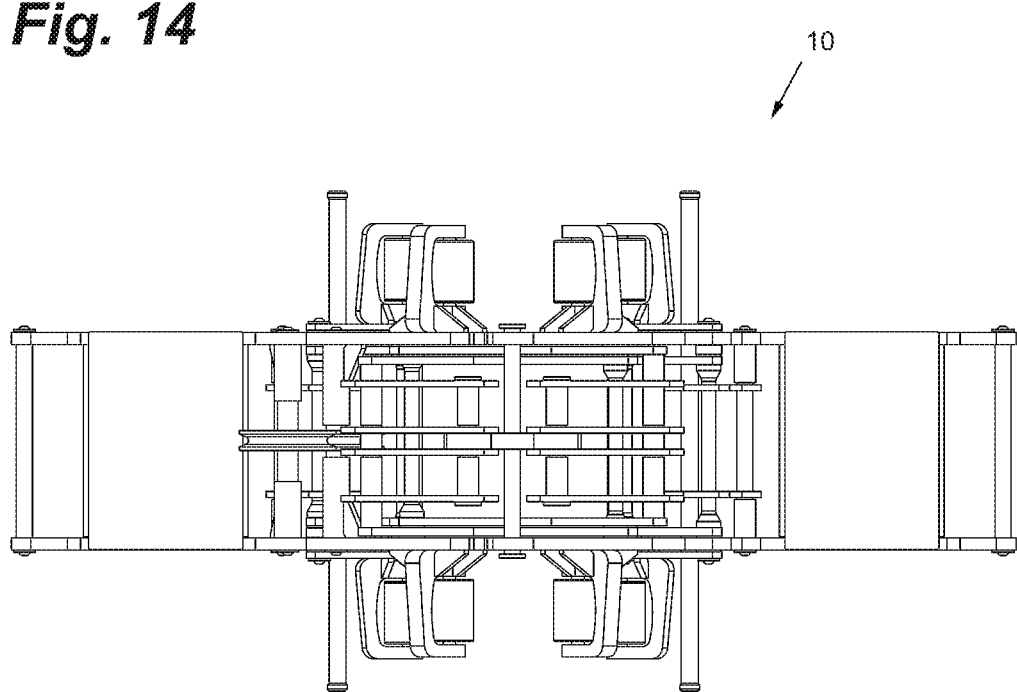
FIG. 14 is a top view of the pipe spinner and lifter of the embodiment of FIG. 12, shown in the open and unlocked configurations.
Figure 15:
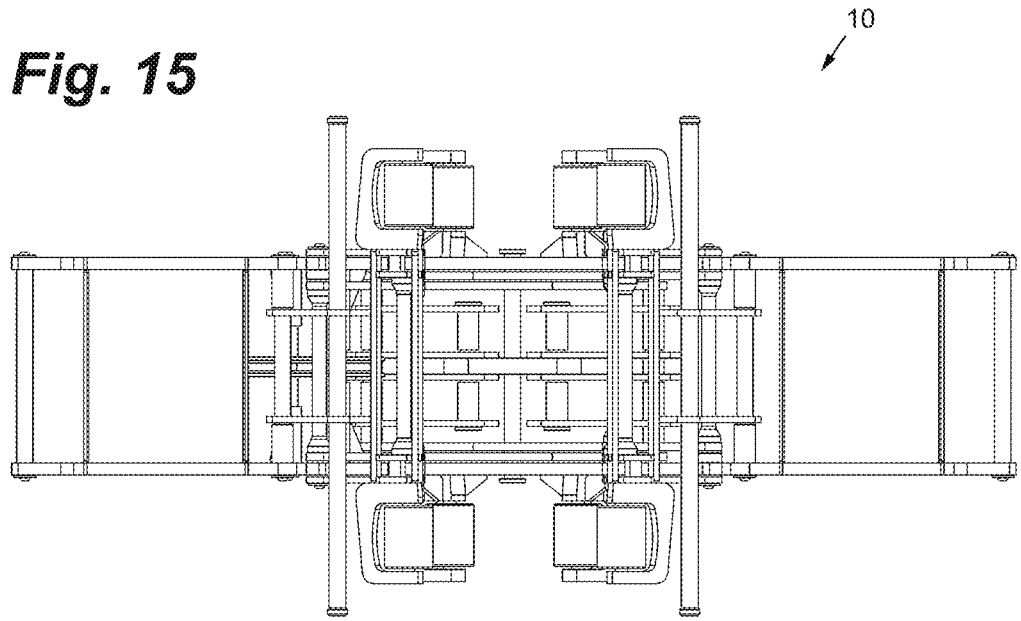
FIG. 15 is a bottom view of the pipe spinner and lifter of the embodiment of FIG. 12, shown in the open and unlocked configurations.
Figure 16:
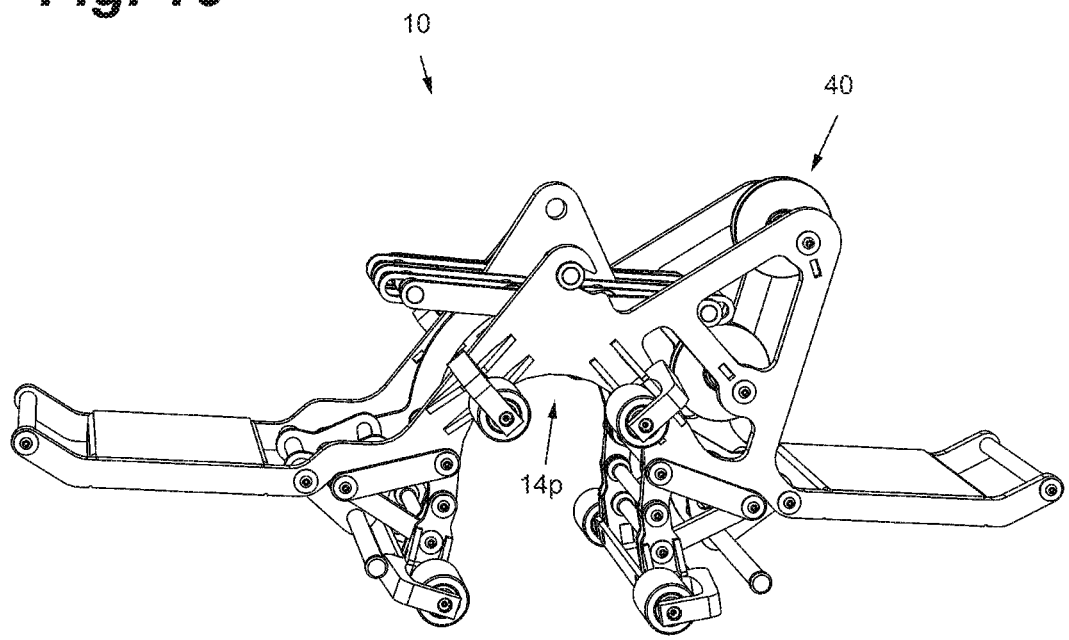
FIG. 16 is a rear perspective view of the pipe spinner and lifter of the embodiment of FIG. 12, shown in the open and unlocked configurations.
Figure 17:
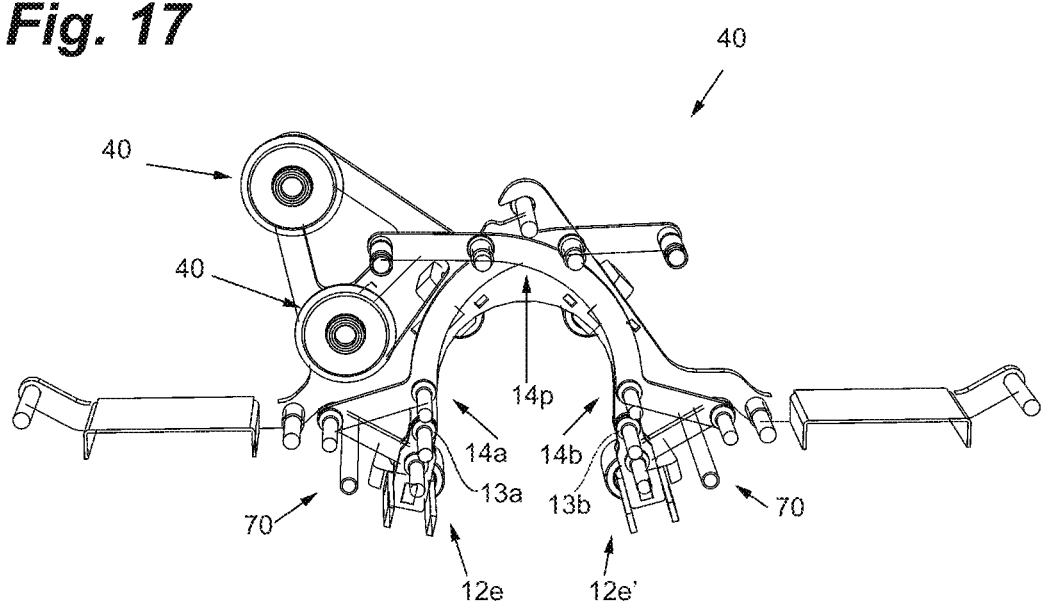
FIG. 17 is a front sectioned perspective view of the pipe spinner and lifter of the embodiment of FIG. 12, shown in the open and unlocked configurations.
Figure 18:
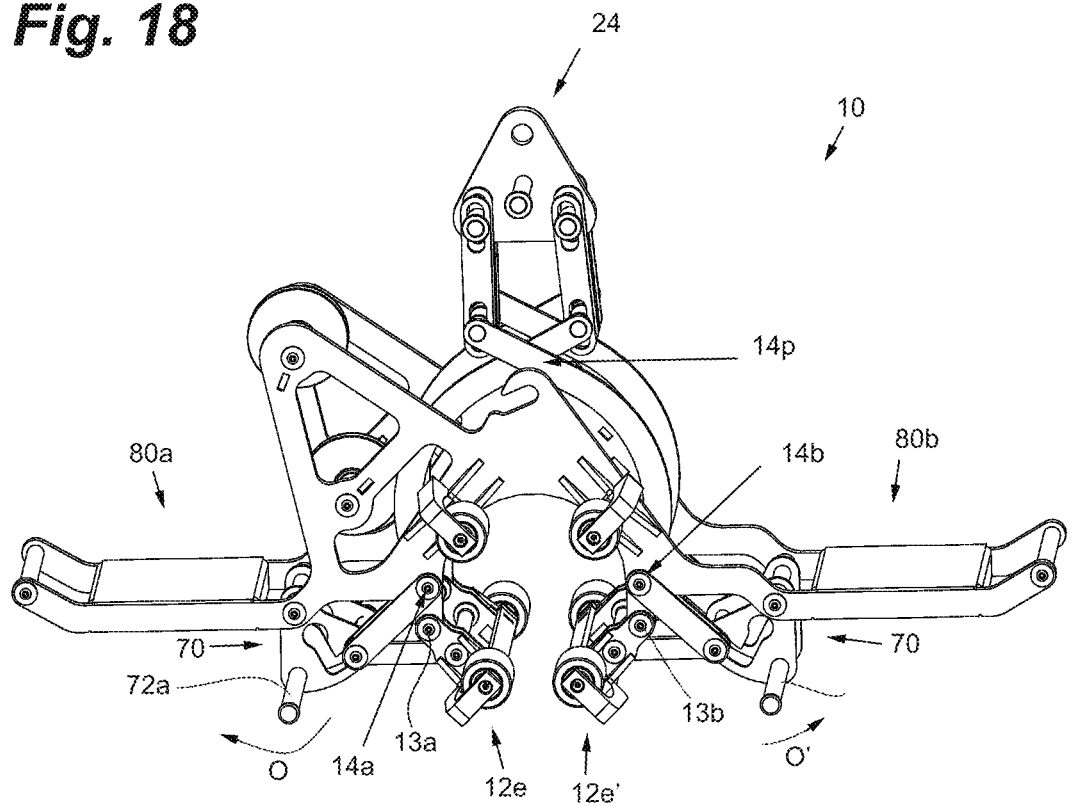
FIG. 18 is a front perspective view of the pipe spinner and lifter of the embodiment of FIG. 12, now shown in the closed and locked configurations.
Figure 19:
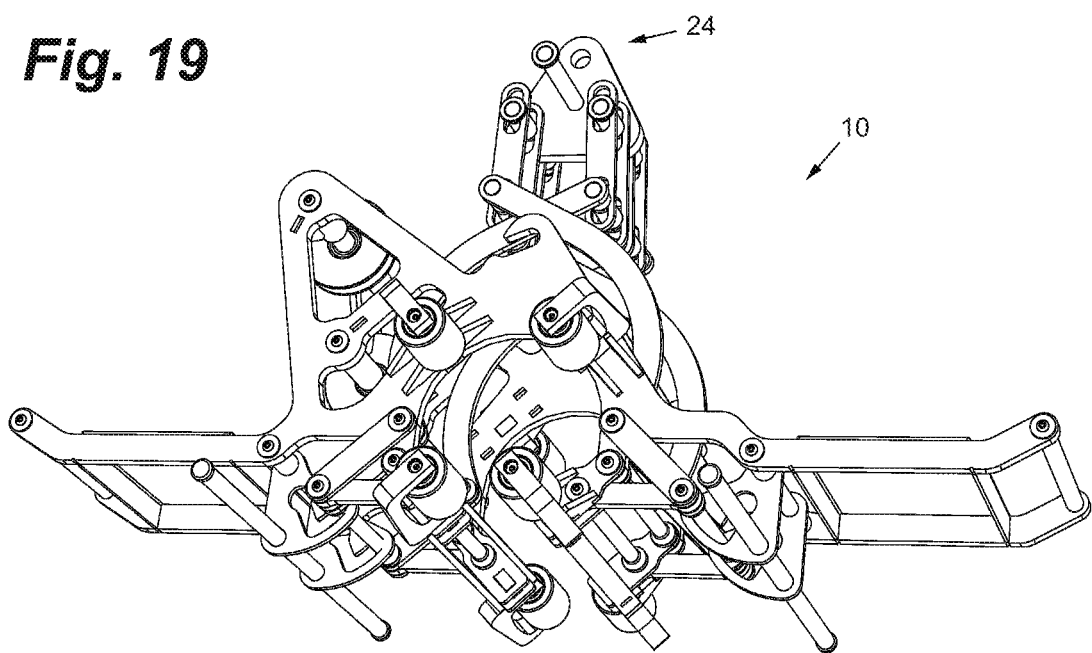
FIG. 19 is a front bottom perspective view of the pipe spinner and lifter of the embodiment of FIG. 12, shown in the closed and locked configurations.
Figure 20:
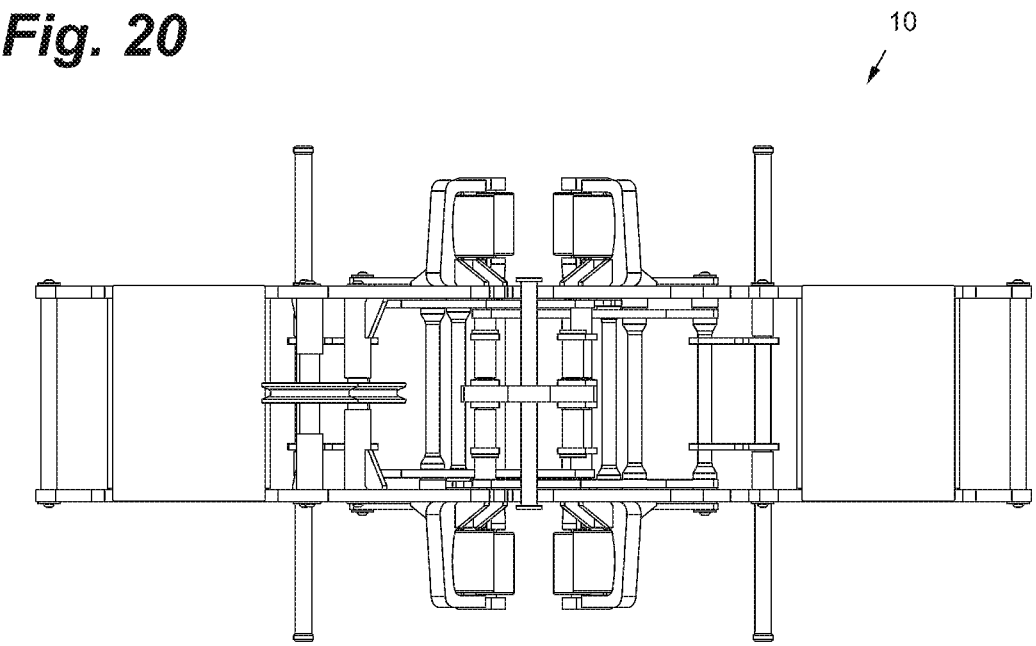
FIG. 20 is a top view of the pipe spinner and lifter of the embodiment of FIG. 12, shown in the closed and locked configurations.
Figure 21:
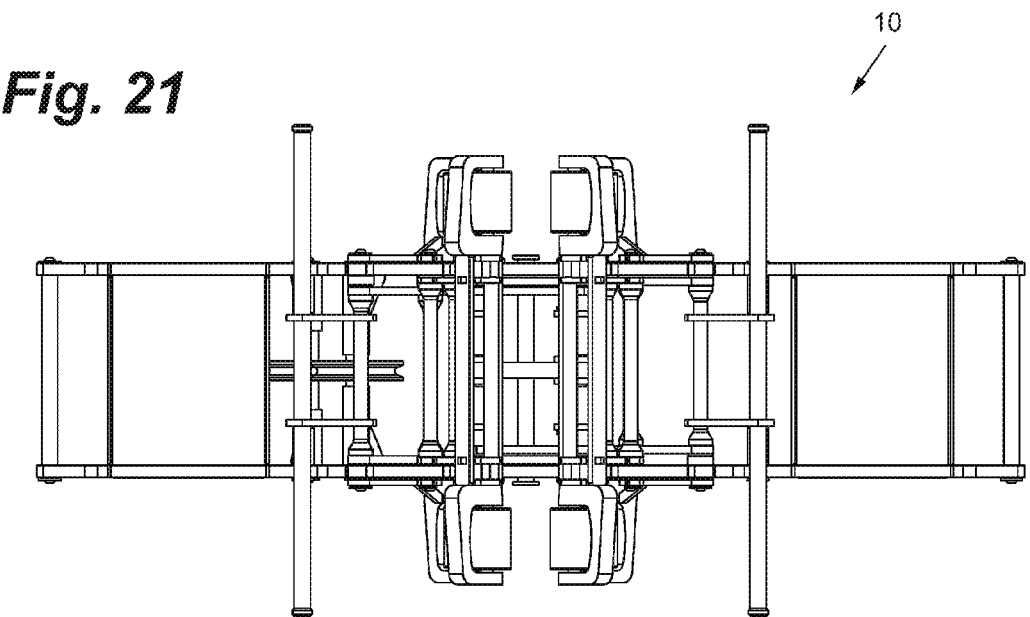
FIG. 21 is a bottom view of the pipe spinner and lifter of the embodiment of FIG. 12, shown in the closed and locked configurations.
Figure 22:
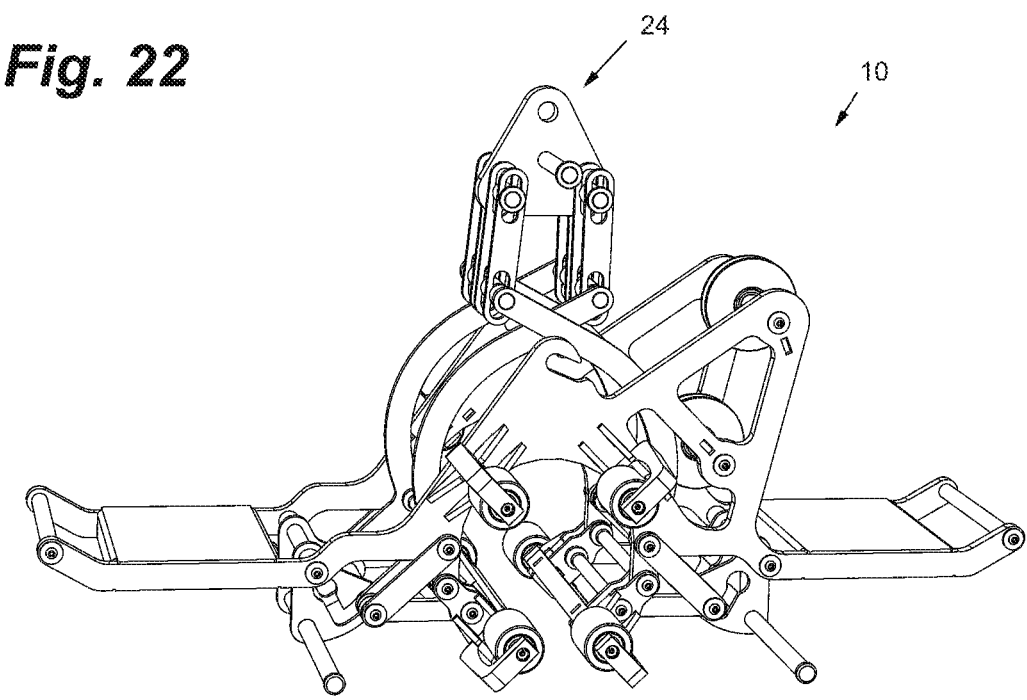
FIG. 22 is a rear perspective view of the pipe spinner and lifter of the embodiment of FIG. 12, shown in the closed and locked configurations.
Figure 23:
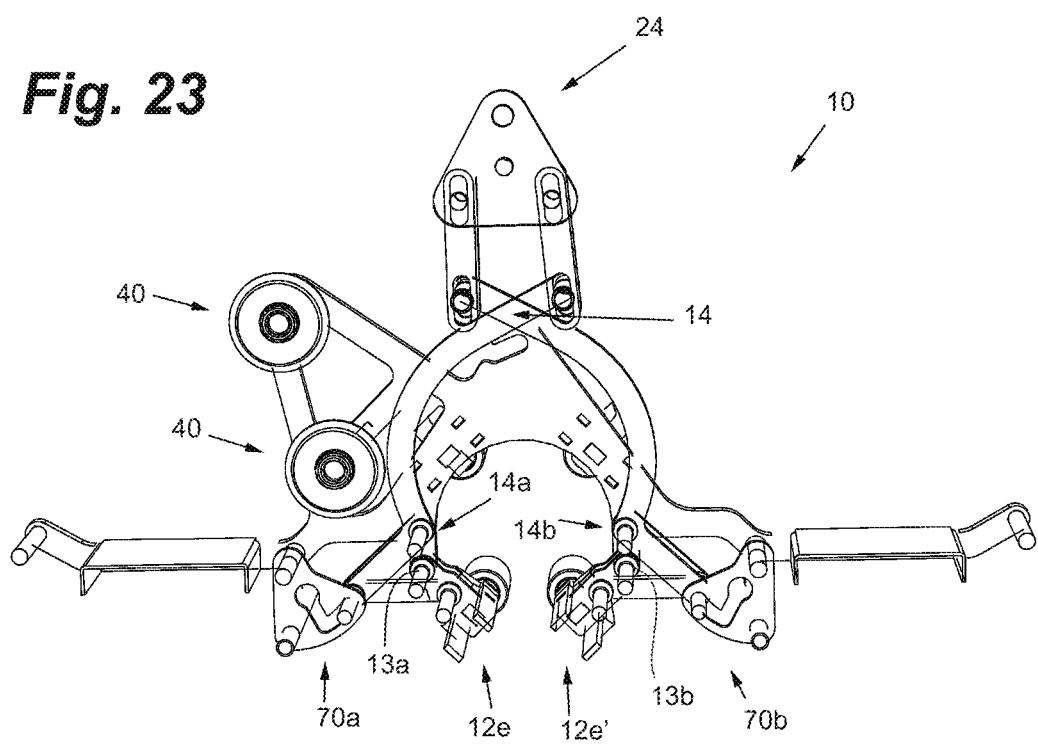
FIG. 23 is a front sectioned perspective view of the pipe spinner and lifter of the embodiment of FIG. 12, shown in the closed and locked configurations.

FIGS. 1-11 show various embodiments of the invention for supporting and rotating pipe and other cylindrical members while in a substantially horizontally orientation. FIGS. 1-8 show a preferred embodiment the pipe spinner and lifter 10. FIGS. 9-11 show another embodiment of the pipe spinner and lifter 10, similar to the embodiment of FIGS. 1-8, but without a counterweight.

Referring generally to the embodiments in FIGS. 1-11, a pipe spinner and lifter 10 preferably comprises a pair of jaws 12a,12b that pivot or actuate so as to configure the pipe spinner and lifter 10 between an open or a closed configuration. More preferably, the pair of jaws 12a,12b each pivot substantially around or about a first pivot point 14p or first pivot member 14. First pivot member 14 may be a bushing, bearing, pin or other suitable member to allow jaws 12a, 12b to pivot thereabout. When in the open configuration, the pipe spinner and lifter 10 can be positioned around a pipe P or other tubular member (e.g. see FIG. 9). When in the closed configuration, the pipe spinner and lifter 10 will securely clamp onto a pipe P (e.g. see FIG. 11).

An actuating linkage 20 is preferably provided between the pair of jaws 12a, 12b and a lifting point or lifting member 24, to actuate the pipe spinner and lifter 10 between the open and closed configurations. Linkage 20 may be a conventional scissor linkage, and lifting member 24 may be a lifting lug having an opening 24o to receive a hook H, strap S or the like from a crane or boom B mounted on a boom truck BT, so as to move and suspend the pipe spinner and lifter 10 above a pipe P in a conventional manner (e.g. FIG. 9). Lifting member 24 is operationally connected to the pair of jaws 12a, 12b, via scissor linkage 20 in a conventional manner, so as to cause the pair of jaws 12a, 12b to actuate or move into the open configuration when the lifting member 24 is moved closer to the pivot member 14 (e.g. when released from boom truck BT), and to cause the pair of jaws 12a, 12b to actuate or move into the closed configuration when the lifting member 24 is moved away from the pivot member 14 (e.g. when being lifted by boom truck BT); all in a similar manner as how a conventional scissor-type pipe clamp is actuated.

More preferably, additional pivoting members 14a, 14b may be provided to increase control of the movement of the jaws 12a, 12b and/or to impart a greater range of motion to the jaws 12a, 12b, i.e. between the open and closed configurations, as compared to embodiments of the invention having only a single pivot member or pivot point 14p (e.g. see the embodiment in FIG. 12-23).

A plurality of rollers 30 are provided to the pair of jaws 12a, 12b, with preferably at least one roller 30 on each of said jaw 12a and 12b. More preferably, a plurality of rollers 30 are provided to each of said jaw 12a and 12b in a pair-wise fashion, with one of each of said paired rollers (e.g. 30a, 30a') positioned substantially at the front end 10f of the pipe spinner and lifter 10, and the other of said paired rollers (e.g. 30b, 30b') positioned substantially at the rear end 10r of the pipe spinner and lifter 10, with each of said paired rollers (e.g. 30a, 30b) rotating about a shared rolling axis (e.g. 30x). For example roller 30a may be provided on jaw 12a at the front end 10f, and roller 30b may be provided on jaw 12a at the rear end 10r, both rollers 30a, 30b rotating about shared axis 30x.

Preferably, a plurality of paired rollers (e.g. 30a/30b, 30a'/30b', 30a''/30b'', and 30a'''/30b''') are provided on the pair of jaws 12a, 12b in a substantially mirrored arrangement (with the arrangement of rollers 30 on jaw 12b being a substantially mirror image of the arrangement of rollers on jaw 12a), each pair rotating about its own rolling axis (e.g. 30x, 30x', 30x'', and 30x'''); e.g. as shown in FIGS. 1-8. More preferably, each of the paired rollers' rolling axis (e.g. 30x, 30x', 30x'', and 30x''') will be substantially parallel to a pipe's longitudinal axis PA, when a pipe is held by the pipe spinner and lifter 10 in the closed configuration. Even more preferably, at least one pair of rollers is provided at substantially the tips or ends 12e,12e' of each of the jaws 12a, 12b, so as to more easily enable the pipe spinner and lifter 10 to securably and rotatably capture a pipe P or other tubular member when in the closed configuration (e.g. rollers 30a/30b and 30a'/30b' in FIGS. 1-8). Still even more preferably, the pipe spinner and lifter 10 will only engage or contact the pipe P via rollers 30, thereby ensuring that the pipe P is rotatably captured when in the closed configuration.

Rollers 30 are of suitable dimensions and configuration to allow any pipe P or other tubular member that may be held by the pipe spinner and lifter 10, when in the closed configuration, to substantially, freely rotate R about the pipe's longitudinal axis PA (e.g. see FIG. 10) with minimal force or torque being applied to the pipe P. As will now be apparent to those skilled in the art, the pipe spinner and lifter 10, by virtue of the plurality of rollers 30 on the jaws 12a, 12b can rotatably, securably hold a pipe P or other tubular member (when in the closed configuration) so as to allow the pipe P to rotate about its longitudinal axis PA while still being securely held and/or lifted thereby. Advantageously, a pipe P or other tubular member may be lifted with the pipe spinner and lifter 10 (in a substantially similar manner that conventional scissor-type pipe clamps would lift a pipe) and, unlike prior-art pipe lifters, the pipe P can also be rotated about its longitudinal axis while lifted; thereby making any threading/unthreading of a section of pipe significantly easier and safer.

In a preferred embodiment, the pipe spinner and lifter 10 further comprises one or more pulleys, pins or guide members 40 to direct any tensile member T, such as a rope or chain, that may be wrapped around a pipe P substantially towards the pivot 14, and thereafter substantially to one side 10s of the pipe spinner and lifter 10 (e.g. see FIG. 8). As such, said one or more pulleys, pins or guide members 40 thereby create a tensile member guide path GP within the pipe spinner and lifter 10. Preferably, a source of pull 50 is provided on the pipe spinner and lifter 10 at said side 10s to where the tensile member T is directed (e.g. see FIG. 8). The source of pull 50 may be a winch 51 mounted on side 10s and having a winch drum 52 to receive the tensile member T therearound. More preferably, and to assist in maintaining the pipe spinner and lifter 10 in a desired orientation when suspended above a pipe P by lifting member 24, a counterweight 60 is provided at an opposite side 10s' to the side 10s where the winch 51 is mounted.

Advantageously, during operations when the pipe spinner and lifter 10 is in the closed configuration and has securably and rotatably captured a pipe P, a tensile member T may be first wrapped around the pipe P (e.g. FIG. 9), through the pipe spinner and lifter 10 towards the pivot 14, and then towards the source of pull 50. Advantageously, when tensile member T is operationally connected to the source of pull 50 (e.g. by being wrapped around drum 52), and when a pulling force is imparted from said source of pull 50, the tensile member T will cause the pipe P to rotate R about its longitudinal axis PA and be further directed towards the pivot 14 within the jaws 12a, 12b; thereby further facilitating the secured capturing of pipe P by lifter 10 while in the closed configuration.

Preferably, tensile member T is sufficiently long so that it will not pull entirely off of pipe P, and/or through the pipe spinner and lifter 10, while a pulling force is being applied to it during rotation operations. Advantageously, tensile member T and source of pull 50 act to rotate pipe P about its longitudinal axis PA, thereby obviating the need to manually rotate pipe P (e.g. with a strap wrench) to thread or unthread it. Those skilled in the art will now appreciate that tensile member T may be wrapped around the pipe P in either a clockwise or counter-clockwise manner (relative to its longitudinal axis PA), thereby causing pipe P to rotated in either a clockwise or counter-clockwise manner when a pulling force is imparted from the source of pull 50 the tensile member T wrapped around pipe P. Moreover, those skilled in the art will now also appreciate that the side 10s of the pipe spinner and lifter 10 having the source of pull 50 may also be positioned on either side of the pipe's longitudinal axis PA, thereby providing another way to adjust the direction that pipe P may be rotated R about its longitudinal axis PA.

Therefore, it will now be appreciated by those skilled in the art that by varying the positioning of the source of pull 50 (on one side or the other of pipe's longitudinal axis PA) and/or by varying how tensile member T may be wrapped around pipe P (clockwise or counterclockwise), a desired pipe rotation R about its longitudinal axis PA may be achieved when a pulling force is imparted from the source of pull 50 the tensile member T wrapped around pipe P.

Preferably, the tensile member guide path GP is located substantially midway between the front and rear ends 10f, 10r. More preferably, the tensile member guide path GP is located substantially midway between each of the paired rollers 30 (e.g. substantially midway between rollers 30a/30b; see FIG. 4). Advantageously, any force applied to the tensile member T by the source of pull 50 will be substantially evenly distributed to all of the rollers 30, rather than to the rollers on either one of the front end 10f or the rear end 10r.

Now referring to the embodiment of the pipe spinner and lifter 10 shown in FIGS. 12-23, this embodiment is similar to the one of FIGS. 1-8, except that in this embodiment the tips or ends 12e,12e' of each of the jaws 12a, 12b are pivotally connected to their respective body of the jaws 12a, 12b, preferably via at least one jaw pivot member 13a, 13b. More preferably, a jaw tip locking mechanism 70a, 70b is provided to each of the pivoting jaw tips 12e, 12e', to actuate each tip 12e, 12e' between a locked and unlocked configuration.

The jaw tip locking mechanism 70a, 70b is preferably a mechanical linkage wherein each is manually actuated via a handle 72a, 72b; e.g. moving the handle 72a, 72b in a first direction (e.g. FIG. 18, direction O) to actuate the jaw tip locking mechanism 70a, 70b into the locked configuration, and in a second direction (e.g. FIG. 12, direction I) to actuate the jaw tip locking mechanism 70a, 70b into the unlocked configuration. Even more preferably, the jaw tip locking mechanism 70a, 70b operates independently of the actuating linkage 20, and the jaw tips 12e, 12e' are of such dimensions, and pivot about the jaw pivot members 13a, 13b to such an extent, so that: (i) when in the locked configuration (e.g. FIG. 18), the jaw tips 12e, 12e' will securely maintain a hold a pipe P captured within the pipe spinner and lifter 10, even if the lifting member 24 is inadvertently moved closer to the pivot member 14 and the actuating linkage 20 is actuated towards the open configuration; and so that when (ii) in the unlocked configuration (e.g. FIG. 12), the jaw tips 12e, 12e' will pivot open sufficiently to allow release of any pipe P that may be captured within the pipe spinner and lifter 10 when it is actuated into the open configuration. Advantageously, pivoting jaw tips 12e, 12e' and the jaw tip locking mechanism 70a, 70b, provide an additional safety feature to the pipe spinner and lifter 10—i.e. to securely actuate it into a locked configuration wherein a pipe P that is captured therewithin will be securely retained, even if the pipe spinner and lifter 10 is accidentally actuated to the open configuration.

More preferably, the embodiment of FIGS. 12-23 further comprises a support 80a, 80b, such as a platform or arm, on each side 10s, 10s' upon which to mount or place the source of pull and/or counterweight.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The invention claimed is:

1. A pipe spinner and lifter for supporting and rotating a cylindrical member having a longitudinal axis, the pipe spinner and lifter comprising:
   a pair of jaws that pivot about a pivot member to allow the pipe spinner and lifter to actuate between an open configuration and a closed configuration; and
   a plurality of rollers mounted on said pair of jaws, each of said plurality of rollers rotating about a respective rolling axis;
   wherein the cylindrical member may be rotatably captured by the pipe spinner and lifter, to allow said cylindrical member to rotate about said longitudinal axis in a substantially horizontal orientation, when the pipe spinner and lifter is in the closed configuration;
   wherein the pair of jaws each have an end with a jaw tip; and
   wherein the jaw tip can actuate between a locked and unlocked configuration.

2. The pipe spinner and lifter of claim 1 wherein the plurality of rollers are arranged in a substantially mirrored arrangement on said pair of jaws.

3. The pipe spinner and lifter of claim 1 wherein the respective rolling axis of each of said plurality of rollers is substantially parallel to the cylindrical member's longitudinal axis when said cylindrical member is rotatably captured by the pipe spinner and lifter.

4. The pipe spinner and lifter of claim 1 wherein the pair of jaws each have an end; and
   wherein at least one pair of the plurality of rollers is mounted substantially on the ends of said pair of jaws.

5. The pipe spinner and lifter of claim 1 further comprising at least one guide member to create a tensile member guide path within the pipe spinner and lifter.

6. The pipe spinner and lifter of claim 5 wherein, when a tensile member is first wrapped around the cylindrical member and is then directed substantially towards the pivot member, said at least one guide member subsequently directs said tensile member to a first side of the pipe spinner and lifter; and
   wherein said tensile member does not engage said plurality of rollers.

7. The pipe spinner and lifter of claim 6 further comprising a source of pull at said first side of the pipe spinner and lifter.

8. The pipe spinner and lifter of claim 7 further comprising a counterweight at a second side of the pipe spinner and lifter, said second side being substantially opposite to said first side.

9. The pipe spinner and lifter of claim 8 wherein, when said tensile member is operationally connected to the source of pull, said tensile member will cause the cylindrical member to rotate about its longitudinal axis when the source of pull is actuated.

10. A pipe spinner and lifter for supporting and rotating a cylindrical member having a longitudinal axis, the pipe spinner and lifter comprising:
 a pair of jaws that pivot about a pivot member to allow the pipe spinner and lifter to actuate between an open configuration and a closed configuration; and
 a plurality of rollers mounted on said pair of jaws, each of said plurality of rollers rotating about a respective rolling axis;
 wherein the cylindrical member may be rotatably captured by the pipe spinner and lifter, to allow said cylindrical member to rotate about said longitudinal axis in a substantially horizontal orientation, when the pipe spinner and lifter is in the closed configuration;
 wherein the plurality of rollers are arranged in a substantially mirrored arrangement on said pair of jaws; and
 wherein the respective rolling axis of each of said plurality of rollers is substantially parallel to the cylindrical member's longitudinal axis when said cylindrical member is rotatably captured by the pipe spinner and lifter;
 wherein the pair of jaws each have an end with a jaw tip; and
 wherein the jaw tip can actuate between a locked and unlocked configuration.

11. The pipe spinner and lifter of claim 10 further comprising at least one guide member to create a tensile member guide path within the pipe spinner and lifter;
 wherein, when a tensile member is first wrapped around the cylindrical member and is then directed substantially towards the pivot member, said at least one guide member subsequently directs said tensile member to a first side of the pipe spinner and lifter; and
 wherein said tensile member does not engage said plurality of rollers.

12. The pipe spinner and lifter of claim 11 further comprising:
 a source of pull at said first side of the pipe spinner and lifter; and
 a counterweight at a second side of the pipe spinner and lifter, said second side being substantially opposite to said first side;
 wherein, when said tensile member is operationally connected to the source of pull, said tensile member will cause the cylindrical member to rotate about its longitudinal axis when the source of pull is actuated.

13. A pipe spinner and lifter for supporting and rotating a cylindrical member having a longitudinal axis, the pipe spinner and lifter comprising:
 a pair of jaws that actuate between an open configuration and a closed configuration; and
 a plurality of rollers mounted on said pair of jaws, each of said plurality of rollers rotating about a respective rolling axis;
 wherein the cylindrical member may be rotatably captured by the pipe spinner and lifter, to allow said cylindrical member to rotate about said longitudinal axis, when the pipe spinner and lifter is in the closed configuration;
 wherein the pair of jaws each have an end with a jaw tip;
 wherein each of said jaw tip is pivotally connected to their respective jaw at a jaw pivot member; and
 wherein the jaw tip can actuate between a locked and unlocked configuration.

14. The pipe spinner and lifter of claim 13 further comprising a jaw tip locking mechanism for each of said jaw tips, to actuate said jaw tips between a locked and unlocked configuration.

15. The pipe spinner and lifter of claim 14 wherein the jaw tip locking mechanism is a mechanical linkage; and
 wherein said jaw tip locking mechanism is manually actuated via a handle.

* * * * *